(12) United States Patent
Reeves et al.

(10) Patent No.: US 10,781,811 B2
(45) Date of Patent: Sep. 22, 2020

(54) VOLUMETRIC COMPENSATOR FOR ELECTRIC SUBMERSIBLE PUMP

(71) Applicant: GE Oil & Gas ESP, Inc., Oklahoma City, OK (US)

(72) Inventors: Brian Paul Reeves, Oklahoma City, OK (US); Victor Acacio, Oklahoma City, OK (US); Chengbao Wang, Oklahoma City, OK (US); Omprakash Samudrala, Niskayuna, NY (US)

(73) Assignee: GE Oil & Gas ESP, Inc., Oklahoma City, OK (US)

( * ) Notice: Subject to any disclaimer, the term of this patent is extended or adjusted under 35 U.S.C. 154(b) by 343 days.

(21) Appl. No.: 15/632,311

(22) Filed: Jun. 24, 2017

(65) Prior Publication Data

US 2018/0371852 A1    Dec. 27, 2018

(51) Int. Cl.

| | |
|---|---|
| *F04B 47/06* | (2006.01) |
| *F04D 13/06* | (2006.01) |
| *F04B 17/03* | (2006.01) |
| *F04B 53/00* | (2006.01) |
| *F04D 13/10* | (2006.01) |
| *F04D 13/08* | (2006.01) |
| *H02K 5/132* | (2006.01) |
| *E21B 43/12* | (2006.01) |
| *F04D 25/06* | (2006.01) |

(52) U.S. Cl.
CPC ............ *F04B 47/06* (2013.01); *E21B 43/128* (2013.01); *F04B 17/03* (2013.01); *F04B 53/00* (2013.01); *F04D 13/062* (2013.01); *F04D 13/086* (2013.01); *F04D 13/10* (2013.01); *H02K 5/132* (2013.01); *F04D 25/0686* (2013.01); *H02K 2205/09* (2013.01)

(58) Field of Classification Search
CPC .......... F04B 47/06; F04B 53/00; F04B 17/03; F04D 13/062; F04D 13/086; F04D 13/10; F04D 25/0686; E21B 43/128; H02K 5/132; H02K 2205/09
USPC ........................................................ 417/414
See application file for complete search history.

(56) References Cited

U.S. PATENT DOCUMENTS

| | | | |
|---|---|---|---|
| 2,674,194 A | * | 4/1954 | Arutunoff ........... F04D 13/0653 417/414 |
| 4,558,247 A | * | 12/1985 | Yamamoto ........... H02K 5/1285 310/87 |
| 7,520,735 B2 | | 4/2009 | Merrill et al. |
| 7,854,264 B2 | | 12/2010 | Mandrou et al. |
| 8,328,539 B2 | | 12/2012 | Watson et al. |
| 8,430,649 B2 | | 4/2013 | Albers et al. |
| 2014/0102749 A1 | | 4/2014 | Varkey |

(Continued)

FOREIGN PATENT DOCUMENTS

| | | |
|---|---|---|
| CN | 202872517 U | 4/2013 |
| WO | 2016053658 A1 | 4/2016 |

*Primary Examiner* — Charles G Freay
(74) *Attorney, Agent, or Firm* — Crowe & Dunlevy, P.C.

(57) ABSTRACT

A volumetric compensator assembly for use in the seal section of a pumping system includes an envelope bladder that in turn includes a flexible top sheet and a bottom sheet connected to the top sheet along a pair of side seams and an end seam. The top sheet and bottom sheet together define a bladder interior that has a variable capacity. The volumetric compensator assembly also has a bladder support tube and the envelope bladder is coiled around the bag support tube.

15 Claims, 5 Drawing Sheets

(56) References Cited

U.S. PATENT DOCUMENTS

2014/0219825 A1* 8/2014 Santos .................. E21B 43/128
　　　　　　　　　　　　　　　　　　　　　　　417/53
2014/0322038 A1　10/2014 Du et al.
2015/0132158 A1　　5/2015 Reeves
2017/0159826 A1* 6/2017 Wang ....................... F16J 15/46

* cited by examiner

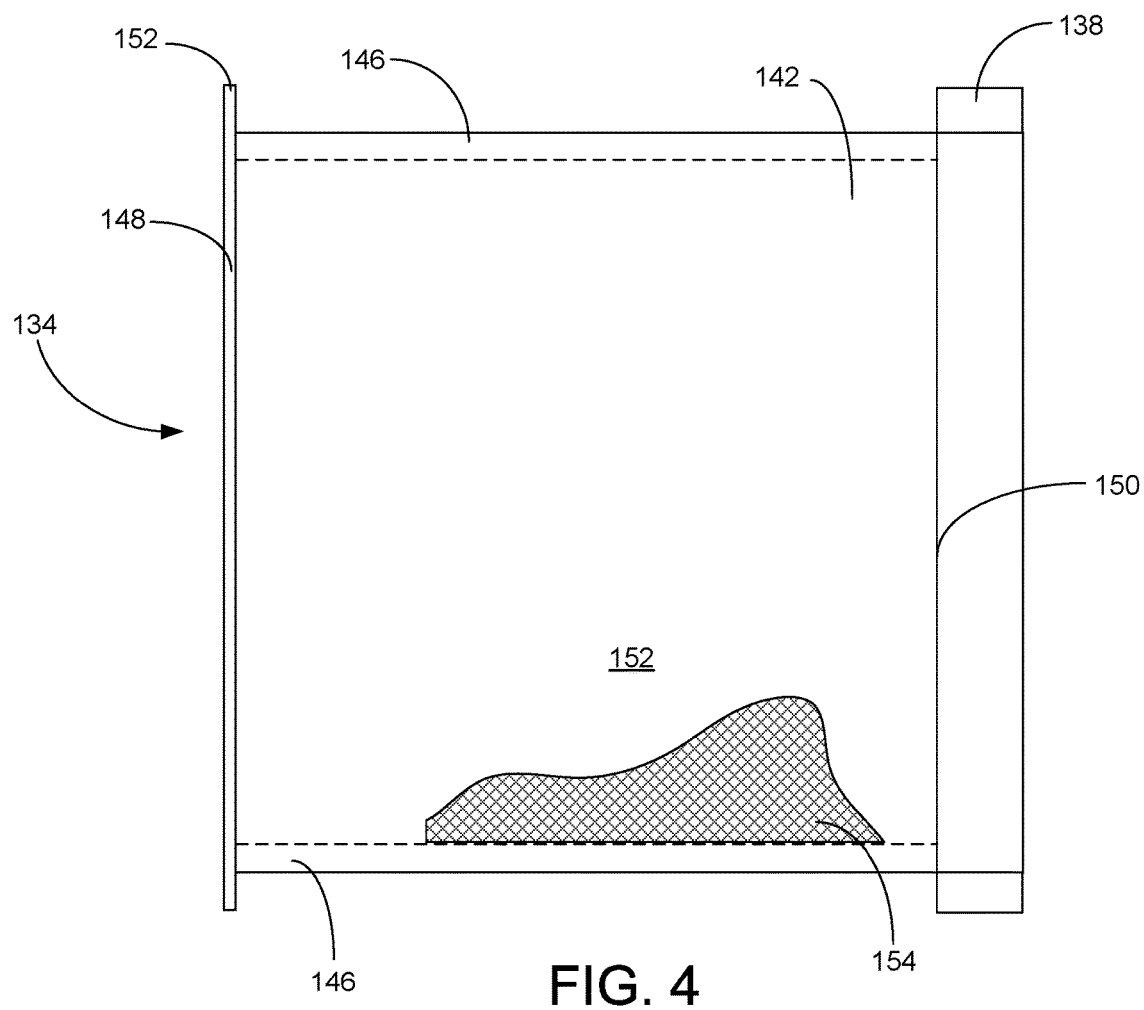
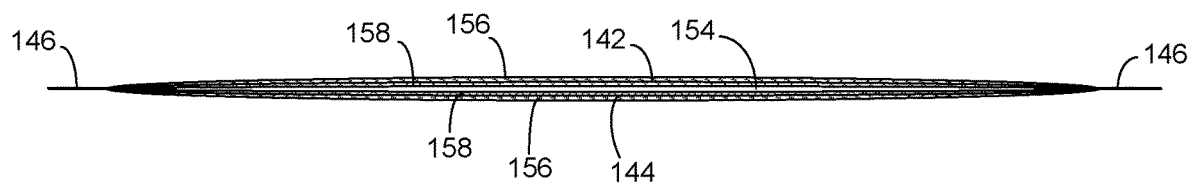
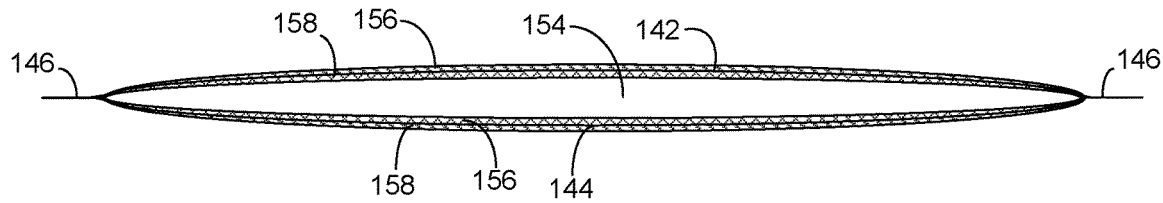

VOLUMETRIC COMPENSATOR FOR ELECTRIC SUBMERSIBLE PUMP

FIELD OF THE INVENTION

This invention relates generally to the field of submersible pumping systems, and more particularly, but not by way of limitation, to an improved volumetric compensator for use in the seal section of a submersible pumping system.

BACKGROUND

Submersible pumping systems are often deployed into wells to recover petroleum fluids from subterranean reservoirs. Typically, the submersible pumping system includes a number of components, including one or more fluid filled electric motors coupled to one or more high performance pumps. Each of the components and sub-components in a submersible pumping system must be engineered to withstand the inhospitable downhole environment, which includes wide ranges of temperature, pressure and corrosive well fluids.

Components commonly referred to as "seal sections" protect the electric motors and are typically positioned between the motor and the pump. In this position, the seal section provides several functions, including transmitting torque between the motor and pump, restricting the flow of wellbore fluids into the motor, absorbing axial thrust imparted by the pump, and accommodating the expansion and contraction of the dielectric motor lubricant as the motor moves through thermal cycles during operation and pressure equalization. Many seal sections employ seal bags to accommodate the volumetric changes and movement of fluid in the seal section. Seal bags can also be configured to provide a positive barrier between clean lubricant and contaminated wellbore fluid.

At high temperatures, water can permeate through the polymeric barrier materials that are used in modern seal bags. In such high temperature applications, metal barrier materials must be used. Although effective at preventing water permeation at elevated temperatures, metal barrier options are expensive to manufacture and subject to mechanical failure following repeated flexing. There is, therefore, a need for an improved seal bag that exhibits water impermeability under high temperatures while retaining the durability of conventional polymer bags. It is to this and other needs that the present invention is directed.

SUMMARY OF THE INVENTION

In one aspect, the present invention provides a volumetric compensator assembly that includes an envelope bladder that in turn includes a flexible top sheet and a bottom sheet connected to the top sheet along one or more seams. The top sheet and bottom sheet together define a bladder interior that has a variable capacity.

In another aspect, the present invention includes a volumetric compensator assembly for use in the seal section of a pumping system. The volumetric compensator assembly has a bladder support tube and an envelope bladder that is coiled around the bag support tube.

In another aspect, the present invention includes a downhole pumping system that has a motor assembly, a pump assembly driven by the motor assembly and a seal section positioned between the pump assembly and the motor assembly. The seal section includes a shaft and a volumetric compensator assembly. The volumetric compensator assembly includes a bladder support tube that surrounds the shaft and has an interior. The volumetric compensator assembly further includes an envelope bladder connected to the bladder support tube.

BRIEF DESCRIPTIONS OF THE DRAWINGS

FIG. 4 is a top plan view of the volumetric compensator assembly of the seal section of FIG. 3.

FIG. 5 is a front view of the envelope bladder in a deflated state.

FIG. 6 is a front view of the envelope bladder in an inflated state.

DETAILED DESCRIPTION

Figure 1:
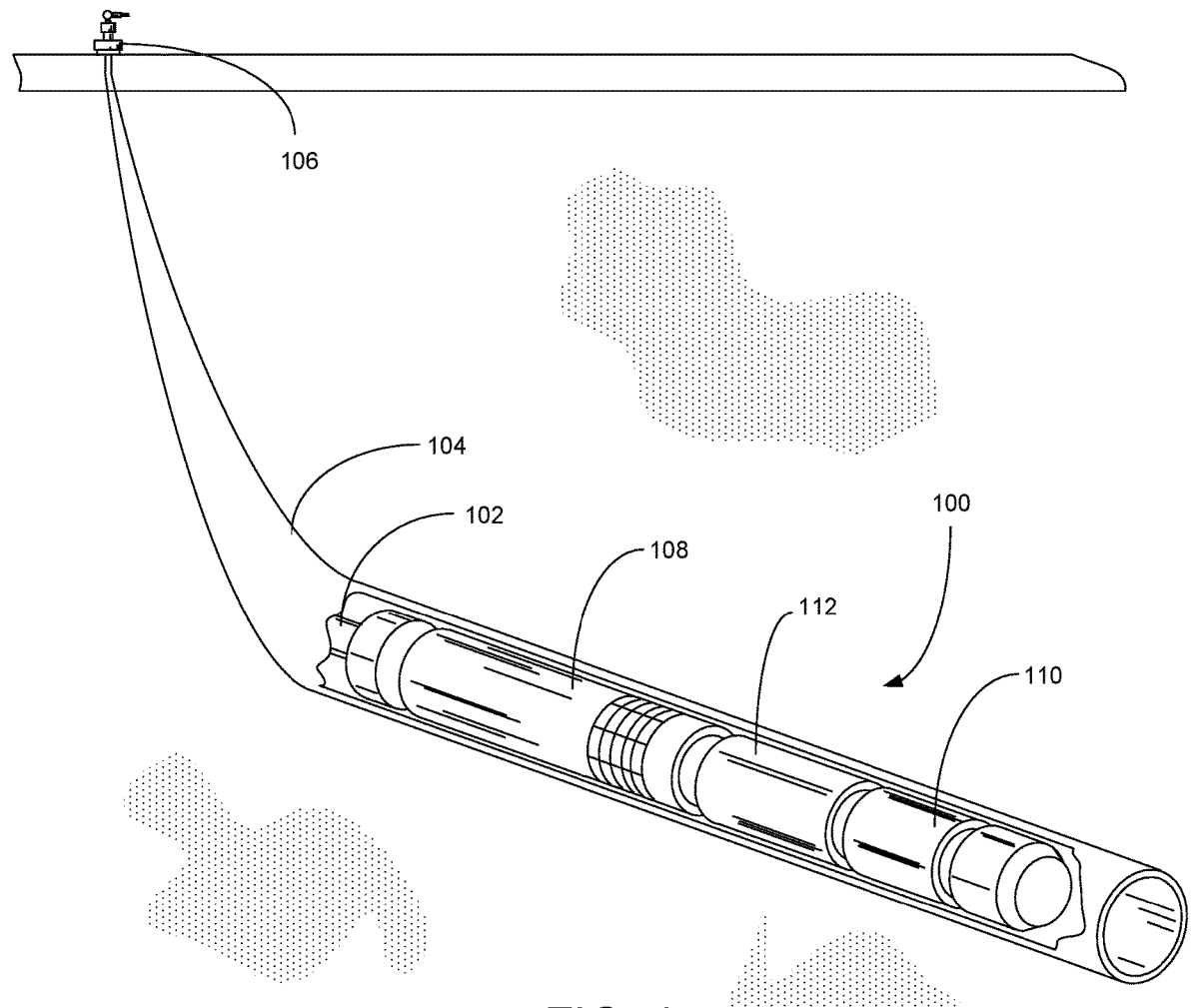
FIG. 1 is a front perspective view of a downhole pumping system in a non-vertical installation.

In accordance with a preferred embodiment of the present invention, FIG. 1 shows a front perspective view of a downhole pumping system 100 attached to production tubing 102. The downhole pumping system 100 and production tubing 102 are disposed in a wellbore 104, which is drilled for the production of a fluid such as water or petroleum. The downhole pumping system 100 is shown in a non-vertical well. This type of well is often referred to as a "horizontal" well. Although the downhole pumping system 100 is depicted in a horizontal well, it will be appreciated that the downhole pumping system 100 can also be used in vertical wells.

As used herein, the term "petroleum" refers broadly to all mineral hydrocarbons, such as crude oil, gas and combinations of oil and gas. The production tubing 102 connects the pumping system 100 to a wellhead 106 located on the surface. Although the pumping system 100 is primarily designed to pump petroleum products, it will be understood that the present invention can also be used to move other fluids. It will also be understood that, although each of the components of the pumping system 100 are primarily disclosed in a submersible application, some or all of these components can also be used in surface pumping operations.

The pumping system 100 preferably includes some combination of a pump assembly 108, a motor assembly 110 and a seal section 112. In some embodiments, the motor assembly 110 is an electrical motor that receives its power from a surface-based supply. The motor assembly 110 converts the electrical energy into mechanical energy, which is transmitted to the pump assembly 108 by one or more shafts. The pump assembly 108 then transfers a portion of this mechanical energy to fluids within the wellbore 104, causing the wellbore fluids to move through the production tubing 102 to the wellhead 106 on the surface. In some embodiments, the pump assembly 108 is a turbomachine that uses one or more impellers and diffusers to convert mechanical energy into pressure head. In an alternative embodiment, the pump assembly 108 is a progressive cavity (PC) or positive displacement pump that moves wellbore fluids with one or more screws or pistons.

The seal section 112 shields the motor assembly 110 from mechanical thrust produced by the pump assembly 108. The seal section 112 is also configured to prevent the introduction of contaminants from the wellbore 104 into the motor assembly 110. Although only one pump assembly 108, seal section 112 and motor assembly 110 are shown, it will be understood that the downhole pumping system 100 could include additional pumps assemblies 108, seals sections 112 or motor assemblies 110.

Figures 2, 3:
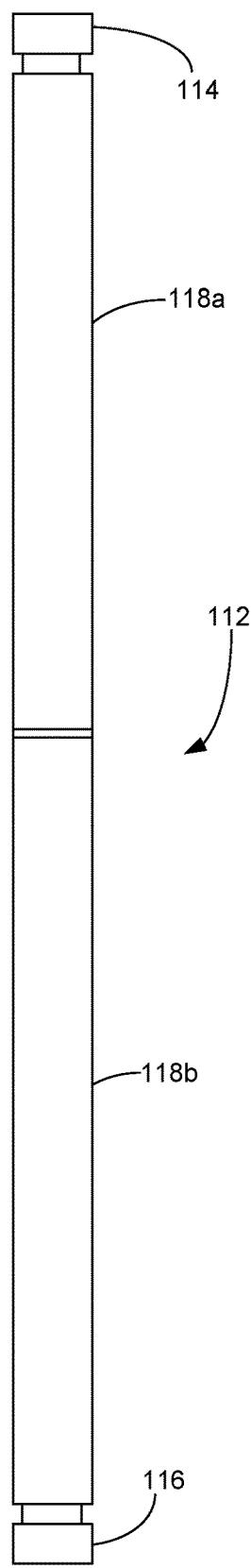
FIG. 2 is an elevational view of a seal section constructed in accordance with a presently preferred embodiment.
FIG. 3 is a cross-sectional view of a portion of the seal section of FIG. 2.

Referring now to FIG. 2, shown therein is an elevational view of the seal section 112. The seal section 112 includes a head 114, a base 116 and two separation modules 118a, 118b. The head 114 is configured for connection to the pump assembly 108 and the base 116 is configured for connection to the motor assembly 110. Although two separation modules 118a, 118b are shown, it will be appreciated that the use of fewer or additional separation modules 118 is within the scope of some embodiments.

Continuing with FIG. 2, but referring now also to FIG. 3, shown therein is a cross-sectional view of the two separation modules 118a, 118b. As depicted in FIG. 3, the seal section 112 includes a common housing 120 and a common shaft 122. The shaft 122 transfers mechanical energy from the motor assembly 110 to the pump assembly 108. The seal section 112 includes an interconnect module 124 that controls the flow of fluids between the two separation modules 118a, 118b. As shown in FIG. 3, the interconnect module 124 may also include seals and bearings to support the shaft 122.

The lower separation module 118b includes a conventional seal bag assembly 126. The seal bag assembly 126 includes a seal bag 128, bag support tube 130 and a seal bag retention mechanism 132. The bag support tube 130 provides support for the seal bag 128 and shields the shaft 122 as its passes through the seal bag 128. In some embodiments, the seal bag 128 is fabricated from a suitable plastic, polymer or elastomer, all of which are commercially available from a number of sources, including E.I. du Pont de Nemours and Company and Daikin Industries. Suitable materials include PFA, AFLAS® and other fluoropolymer plastics that exhibit favorable resistance to corrosive chemicals and elevated temperatures.

In contrast to the seal bag assembly 126 found in the lower separation module 118b, the upper separation module 118a includes a volumetric compensator assembly 134. Generally, the volumetric compensator assembly 134 includes a substantially flat envelope bladder 136 that is secured to a bladder support tube 138. The bladder support tube 138 surrounds the shaft 122 and provides a fluid path from the motor assembly 110, around the shaft 122, through ports 140 to the interior of the envelope bladder 136. The envelope bladder 136 expands and contracts as fluid passes in and out of the envelope bladder 136.

The volumetric compensator assembly 134 is shown in greater detail in FIGS. 4-10. FIG. 4, show a top, partial cut-away view of the envelope bladder 136. FIGS. 5 and 6 provide end views of the envelope bladder 136 deflated and inflated, respectively. As illustrated in these drawings, the envelope bladder 136 includes a top sheet 142, a bottom sheet 144, side seams 146, an end seam 148 and a mouth 150 secured to the bladder support tube 138. The top sheet 142 and bottom sheet 144 are connected along the side seams 146, and end seam 148. The top sheet 142 and bottom sheet 144 can be secured together with adhesives, welding, brazing, diffusion bonding, crimping or through mechanical clamping mechanisms. In some embodiments, it may be desirable to support the end seam 148 with a support rod 152. In each case, the top sheet 142 and bottom sheet 144 are secured to one another in a fluid-impermeable connection. When joined together in this manner, the top sheet 142 and bottom sheet 144 together define a variable volume bladder interior 154 that accommodates the expansion and contraction of fluids from the motor assembly 110.

The relatively flat construction of the envelope bladder 136 permits the use of highly impermeable metal materials. In some embodiments, the envelope bladder 136 includes an outer foil layer 156 that is fused or otherwise secured to a support matrix 158. The support matrix 158 can be manufactured from flexible wire mesh to which the outer foil layer 156 is welded, brazed, diffusion bonded, glued or otherwise secured. In other embodiments, the envelope bladder 136 is constructed from a single layer of material. Suitable materials of construction include metal foils and plastic and polymer or elastomers, such as polytetrafluoroethylene (PTFE) and perfluoroalkoxy (PFA).

Figure 7:
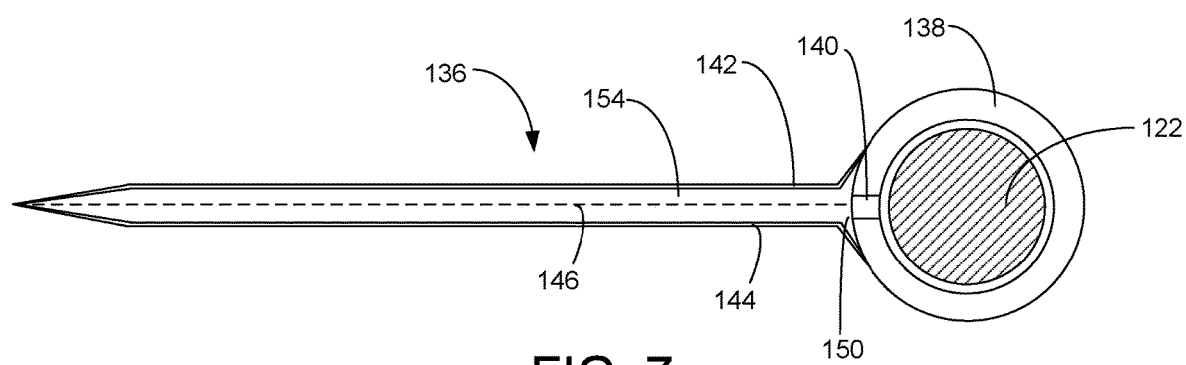
FIG. 7 is a side view depicting the connection of the envelope bladder to the bladder support tube in a first embodiment.
Figure 8:
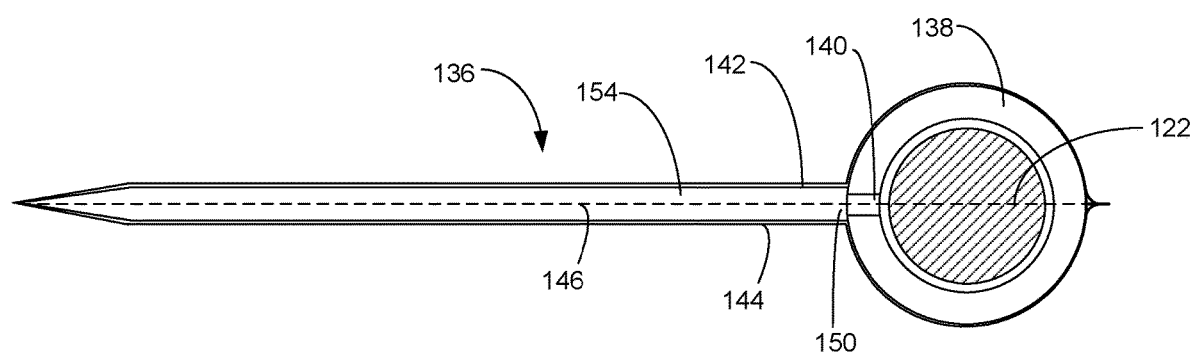
FIG. 8 is a side view depicting the connection of the envelope bladder to the bladder support tube in a second embodiment.

Turning to FIGS. 7-8, the mouth 150 of the envelope bladder 136 is secured to the bladder support tube 138 such that the ports 140 in the bladder support tube 138 place the bladder interior 154 in fluid communication with the interior of the bladder support tube 138. In FIG. 7, the mouth 150 is affixed directly to the side of the bladder support tube 138. The envelope bladder 136 can be affixed to the bladder support tube 138 with adhesives, welding, brazing, diffusion bonding, fasteners or mechanical clamps. Alternatively, as depicted in FIG. 8, the envelope bladder 136 can be placed around the bladder support tube 138. In this embodiment, the leading edges of the top sheet 142 and bottom sheet 144 are wrapped around and secured to the bladder support tube 138 in a fluid-impermeable manner using adhesives, welding, brazing, diffusion bonding, or mechanical clamps.

Figure 9:
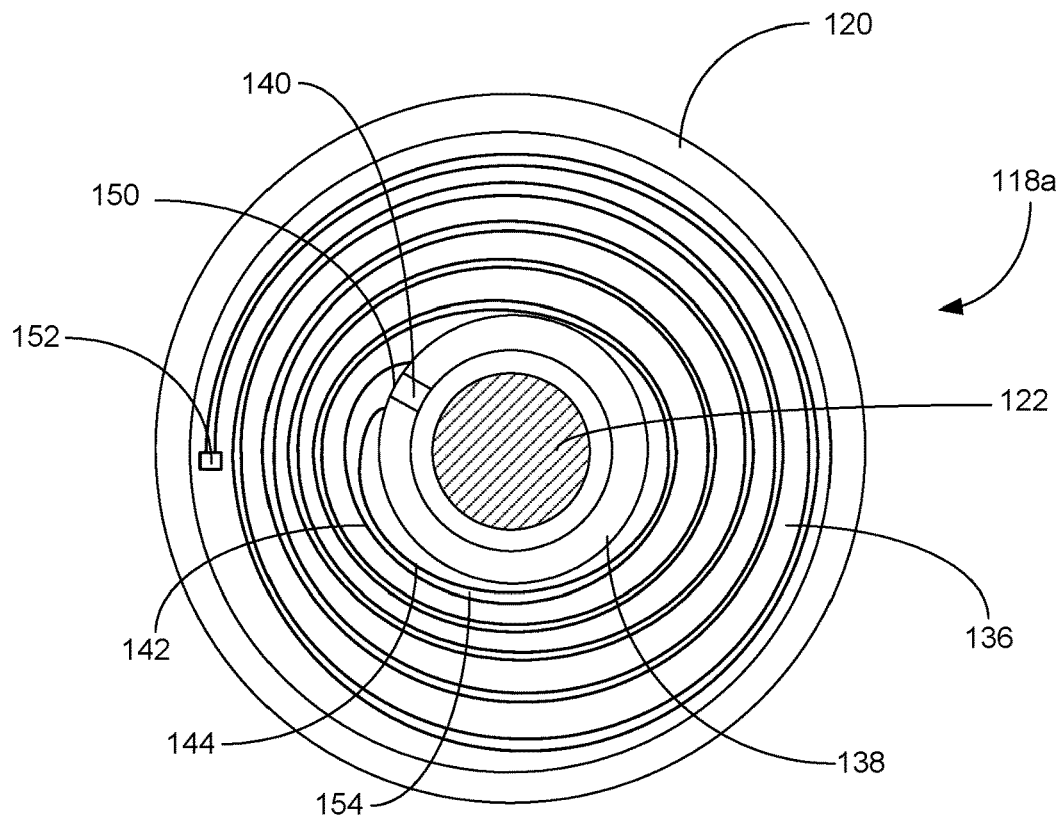
FIG. 9 is a top view of the volumetric compensator depicting the deflated envelope bladder in a coiled configuration.
Figure 10:
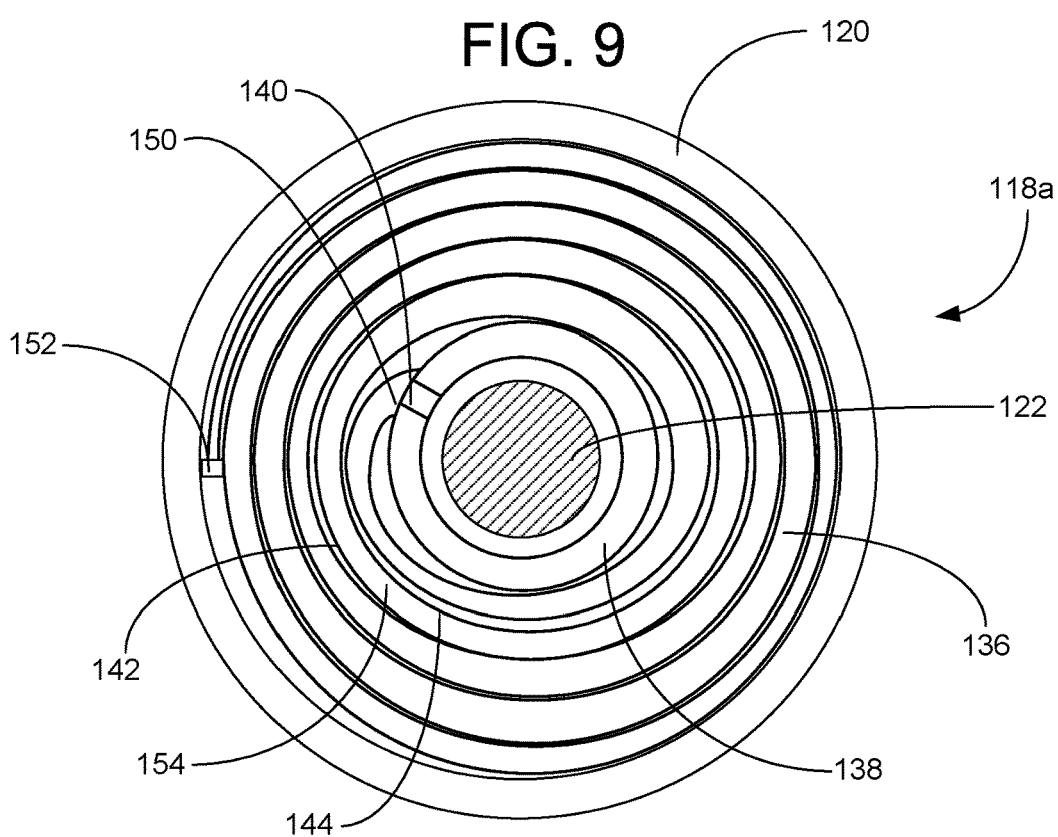
FIG. 10 is a top view of the volumetric compensator depicting the inflated envelope bladder in a coiled configuration.

Turning to FIGS. 9 and 10, shown therein is the envelope bladder 136 in deflated and inflated conditions, respectively. To increase the internal capacity of the envelope bladder 136, the envelope bladder 136 is designed to be coiled around the bladder support tube 138 within the housing 120. In this configuration, the envelope bladder 136 can be constructed so that the interior space of the envelope bladder 136 is only slightly smaller than the interior space within the housing 120. Notably, as the envelope bladder 136 expands, the mechanical stresses caused by the expanding bladder are limited and offset by contact between the adjacent layers of the coiled envelope bladder 136. In this way, the coiled envelope bladder 136 provides a large capacity, flexible and durable dynamic-capacity fluid isolation mechanism that has a substantially planar geometry that permits the use of high-temperature metallic materials.

Although the volumetric compensator assembly 134 is disclosed within the seal section 112, it will be understood that the volumetric compensator assembly 134 may also be incorporated within a designated fluid expansion module connected directly or indirectly to the motor assembly 110. For example, in some embodiments, the volumetric compensator assembly 134 is incorporated within a designated fluid expansion module connected to the opposite end side of the motor assembly 110 from the seal section 112. In yet other embodiments, two or more volumetric compensator assemblies 134 are incorporated within the pumping system 100. In such embodiments, it may be useful to employ volumetric compensator assemblies 134 above and below the motor assembly 110 to both shield the motor assembly 110 from wellbore fluids and to permit the expansion and contraction of lubricants within the motor assembly 110.

The exemplary embodiments include a method of isolating expanding fluids using the volumetric compensator assembly 134. The method includes the steps of providing the volumetric compensator assembly 134 within a component in the pumping system 100 such that an internal fluid is placed in fluid communication with the bladder interior 154 of the envelope bladder 136. The method further includes the step of containing the interior fluid within the envelope bladder 136 as it expands under increasing pressure. The step of containing the interior fluid within the envelope bladder 136 further comprises containing the interior fluid within the envelope bladder 136 as the envelope bladder 136 uncoils within the component of the pumping system 100.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A volumetric compensator assembly for use in a pumping system, the volumetric compensator assembly comprising an envelope bladder that in turn comprises:
    a top sheet, wherein the top sheet is flexible;
    a bottom sheet, wherein the bottom sheet is connected to the top sheet along one or more seams, and wherein the top sheet and bottom sheet together define a bladder interior that has a variable capacity to accommodate the expansion or contraction of fluid in the pumping system; and
    wherein the envelope bladder is coiled around a bladder support tube such that adjacent layers of the coiled envelope bladder contact one another as the envelope bladder expands.

2. The volumetric compensator assembly of claim 1, wherein the envelope bladder is connected to the bladder support tube.

3. The volumetric compensator assembly of claim 1, wherein the bladder support tube includes ports that place the bladder interior in fluid communication with the bladder support tube.

4. The volumetric compensator assembly of claim 3, wherein the envelope bladder further comprises a mouth secured to the bladder support tube.

5. The volumetric compensator assembly of claim 1, wherein the top and bottom sheets each comprise:
    a support matrix; and
    a metal foil layer attached to the support matrix.

6. A volumetric compensator assembly for use in the seal section of a pumping system, the volumetric compensator assembly comprising:
    a bladder support tube; and
    an envelope bladder, wherein the envelope bladder is coiled around the bag support tube, and wherein the envelope bladder comprises:
        a top sheet;
        a bottom sheet connected to the top sheet along an end seam and opposing side seams to provide the envelope bladder with a substantially planar geometry; and
        wherein each of the top and bottom sheets comprises:
            a support matrix; and
            a metal foil layer attached to the support matrix.

7. The volumetric compensator assembly of claim 6, wherein the envelope bladder further comprises a mouth and wherein the mouth is connected to the bladder support tube.

8. A downhole pumping system comprising:
    a motor assembly;
    a pump assembly driven by the motor assembly; and
    a seal section positioned between the pump assembly and the motor assembly, wherein the seal section comprises:
        a shaft; and
        a volumetric compensator assembly, wherein the volumetric compensator assembly comprises:
            a bladder support tube surrounding the shaft, wherein the bladder support tube includes an interior; and
            an envelope bladder connected to the bladder support tube, wherein the envelope bladder comprises:
                a top sheet;
                a bottom sheet connected to the top sheet along an end seam and opposing side seams to provide the envelope bladder with a substantially planar geometry; and
                wherein each of the top and bottom sheets comprises a support matrix and a metal foil layer attached to the support matrix.

9. The pumping system of claim 8, wherein the top sheet and bottom sheet together define a bladder interior that has a variable capacity.

10. The pumping system of claim 9, wherein the envelope bladder is coiled around the bag support tube.

11. The pumping system of claim 10, wherein the bladder support tube includes ports that place the bladder interior in fluid communication with the interior of the bladder support tube.

12. The pumping system of claim 8, wherein the envelope bladder further comprises a support rod and wherein the end seam is connected to the support rod.

13. The pumping system of claim 9, wherein the seal section further comprises a housing and wherein the envelope bladder occupies space between the bladder support tube and the housing in an inflated state.

14. The pumping system of claim 8, wherein the seal section further comprises seal bag assembly, wherein the seal bag assembly comprises:
    a seal bag;
    a bag support tube that passes through the seal bag; and
    a seal bag retention mechanism that secures the seal bag to the bag support tube.

15. The pumping system of claim 8, wherein the envelope bladder is rectangular and configured to be coiled around the bladder support tube.

* * * * *